April 17, 1928.
McCLELLAN C. FULLENLOVE
1,666,131
MOTION PICTURE PROJECTION APPARATUS
Filed Jan. 15, 1926    2 Sheets-Sheet 1
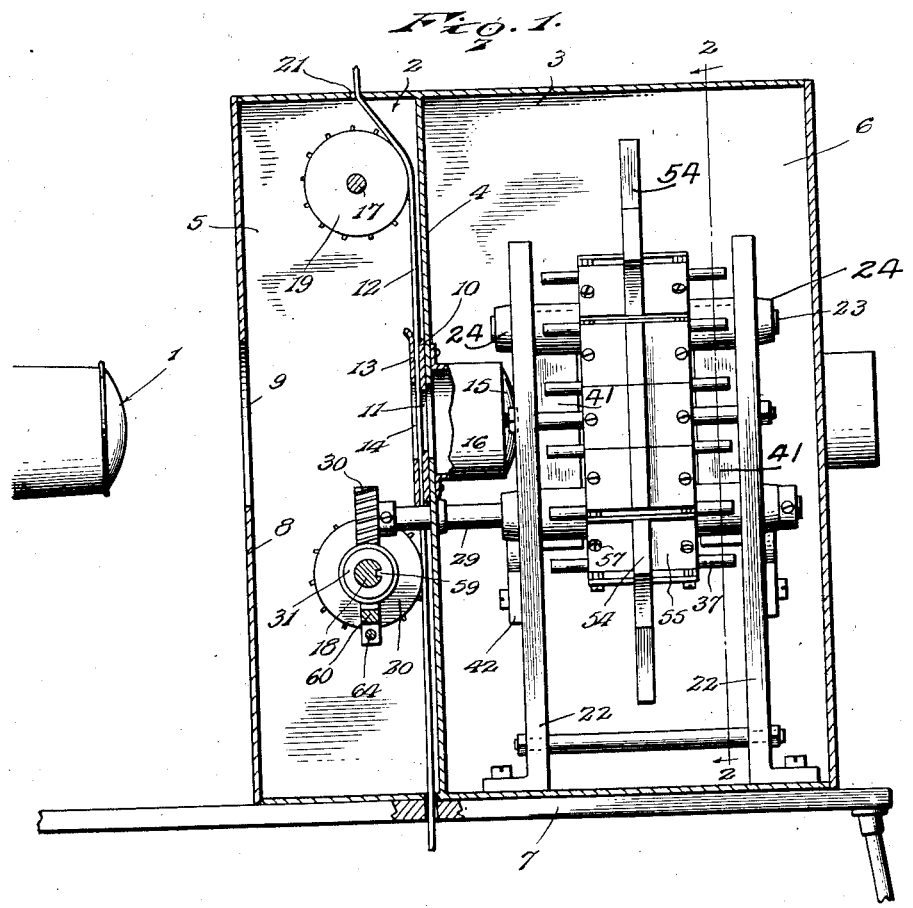
Inventor
Mc C. C. Fullenlove.
By Attorneys April 17, 1928.
McCLELLAN C. FULLENLOVE
1,666,131
MOTION PICTURE PROJECTION APPARATUS
Filed Jan. 15, 1926 2 Sheets-Sheet 2
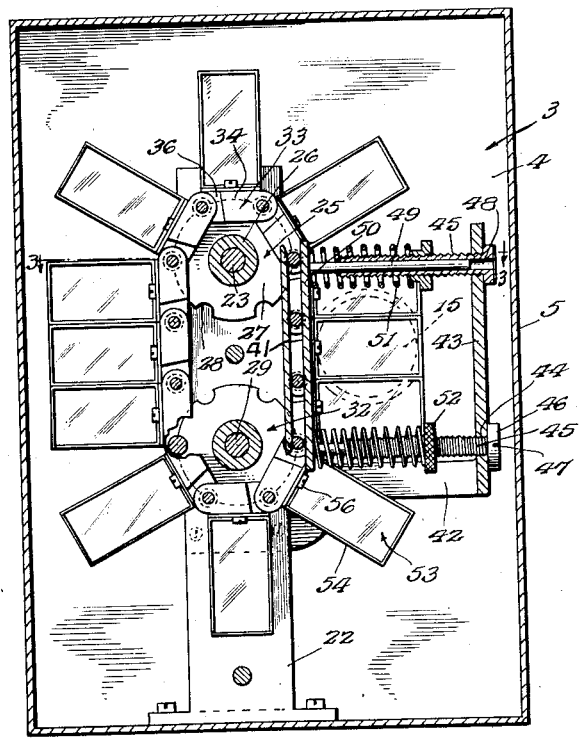
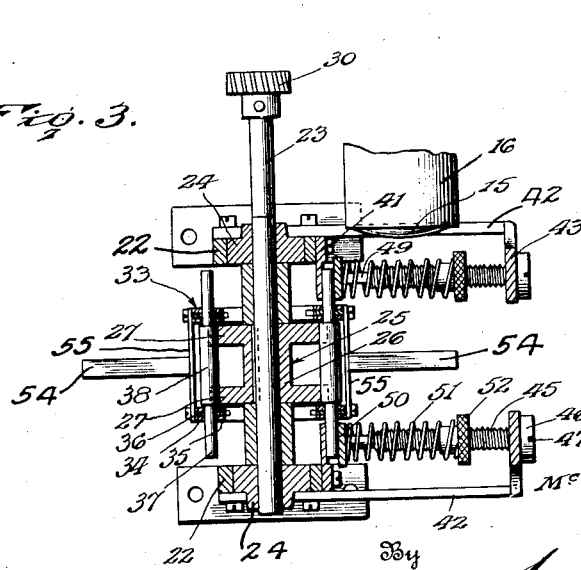
Inventor
McC. C. Fullenlove.
By Lacy Lacy, Attorneys Patented Apr. 17, 1928.

1,666,131

UNITED STATES PATENT OFFICE.

McCLELLAN C. FULLENLOVE, OF TOLEDO, OHIO, ASSIGNOR OF THIRTY PER CENT TO ALBERT J. BUCHHEIT, TWENTY-FIVE PER CENT TO WALTER V. GHISLIN, BOTH OF PARK RIDGE, ILLINOIS, AND TWENTY PER CENT TO WILLIAM BUCHHEIT, OF ASBURY PARK, NEW JERSEY.

MOTION-PICTURE-PROJECTION APPARATUS.

Application filed January 15, 1926. Serial No. 81,489.

This invention relates to improvements in motion picture projection apparatus and more particularly to that class of such apparatus in which a series of projecting lenses are continuously moved in consonance with the movement of the film.

One of the objects of the present invention is to provide a novel construction of the projecting lenses and the means provided for moving the same in consonance with the movement of the film. In motion picture projection apparatus of the type referred to above, the lenses are, in every instance, so far as I am aware, of the circular convex type and are mounted in lens barrels or casings, which casings are carried by endless sprocket chains and means is provided for imparting travel to the chains so as to cause the lenses to move continuously across the optical axis of the projection lens system. However, such an arrangement presents the disadvantage that the optical axes of the movable projecting lenses are spaced apart throughout the series a considerable distance with the result that perfect results are not obtained and the picture areas of the film are not projected with the desired brilliancy and sharpness. Therefore, the present invention contemplates the utilization of a novel type of lens, the marginal contour of which will be such as to provide for positioning of the lenses with relation to one another in such manner that their optical axes will be spaced apart, in relatively adjacent lenses, a minimum distance, so that there will be maximum illumination of the screen at each period of projection and the picture areas of the film will be projected with great brilliancy and sharpness.

Another object of the invention is to so construct the means provided for supporting the projecting lenses for movement or travel that said means will not perceptibly interfere with the passage of light rays from the projection apparatus to the screen whereas, in the ordinary types of projection apparatus of this class the lens mountings will materially interfere with the passage of light rays to the screen, thus producing a blurred effect.

Likewise, where circular lenses are employed and are mounted in barrels or tubular casings, the lens system as a whole is cumbersome and there is certain to be vibrations of the lenses to an extent to cause very perceptible flicker upon the screen as the successively projected picture areas will not register in accordance with the persistence of vision. Therefore, the present invention has as a further object to provide means for preventing vibration of the projecting lenses during their travel.

Another object of the invention is to provide means whereby the film may be readily and accurately framed in the event the picture areas of the film do not exactly focally register with the optical system of the projecting apparatus.

In the accompanying drawings:

Figure 1 is a vertical front to rear sectional view through the apparatus embodying the invention.

Figure 2 is a vertical transverse sectional view taken substantially on the line 2—2 of Figure 1, looking in the direction indicated by the arrows.

Figure 3 is a horizontal sectional view taken substantially on the line 3—3 of Figure 2, looking in the direction indicated by the arrows.

Figure 4 is a group perspective view illustrating one of the lenses, the mounting therefor, and a portion of the sprocket chain upon which the projecting lenses are supported for travel.

Figure 5 is a view partly in elevation and partly in section, illustrating the framing device for the film.

Figure 6 is a perspective view of one of the lenses constituting a part of the present invention.

In the drawings, the numeral 1 indicates the condensing lens of the lamp house of an ordinary motion picture projection apparatus, by which lens the rays of light are concentrated, and the numeral 2 indicates in general the motion head comprising a casing 3 divided interiorly by a transverse vertical partition 4 to provide a rear compartment 5 and a front compartment 6, the casing being mounted in advance of the condensing lens 1 upon the usual supporting table or base 7, and being provided in its rear wall 8 with an opening 9 for the passage of the light rays from the condensing lens 1. A frame plate 10 is mounted upon the rear side of the partition 4 and is provided with a rectangular framing opening 11 past which the film, indicated by the numeral 12, is moved, the film passing between the said plate and the usual film gate 13 which is mounted in the customary manner and is provided with an opening 14 for the passage of the light rays. The rear objective lens of the optical system of the projection apparatus is indicated by the numeral 15 and is mounted upon the front of the partition 4 in a suitable mounting 16.

In order that the film may be fed continuously, shafts 17 and 18 are rotatably journaled in suitable bearings in the side walls of the compartment 5 above and below the film gate, and carry film sprockets indicated respectively by the numerals 19 and 20, the film 12 being led downwardly through an opening 21 in the top of the said compartment and over the said sprockets at their forward sides. The usual means is provided for imparting continuous rotary motion to the shaft 18 and inasmuch as this means constitutes no part of the present invention, it has been deemed unnecessary to illustrate the same.

The continuously moving lenses constitute the front objective lenses of the optical system and the manner of mounting these lenses and imparting continuous motion thereto in consonance with the movement of the film will now be described. The numeral 22 indicates a pair of uprights which are mounted in front to rear alinement upon the bottom of the compartment 6 and within said compartment at one side of the optical system. A shaft 23 is journaled in suitable bearings 24 in the upper portions of the uprights and has fixed upon it a sprocket which is indicated in general by the numeral 25 and which comprises a hub portion 26 and circular disc portions 27 which are formed in their peripheries with notches 28 of approximately semi-circular form. The sprocket is, in effect, a double sprocket and it will be observed that the portions 27 thereof are relatively spaced, and the purpose of so forming the sprocket will presently be explained. The numeral 29 indicates a shaft which is journaled in suitable bearings in the uprights 22 and which is extended rearwardly beyond the rear upright and through an opening in the partition wall 4 and is provided upon its rear end with a worm pinion 30 which meshes with a worm 31 splined upon the drive shaft 18. A sprocket 32 corresponding in every particular to the sprocket 25 is fixed upon the shaft 29 in the same vertical plane as the said sprocket 25. The double sprockets 25 and 32 support parallel sprocket chains indicated in general by the numeral 32′, each of which comprises a series of links 33, each link comprising a body portion 34 having spaced ears 35 at one end and a single ear 36 at the other end, the ears 36 of the several links being fitted between the ears 35 of the next adjacent links throughout the series, and the reduced ends 37 of pins 38 being fitted through openings 39 and 40 formed in the ears 35 and 36 respectively so as to pivotally connect all of the links. The portions of the pins 38 which extend between corresponding links engage in the notches 28 of the sprocket gears, as clearly shown in Figure 3, and at this point it will be evident that as there is a two-point engagement of each pin with the sprocket gears, a very steady motion is imparted to the sprocket chains. It will be observed that the reduced ends 37 of the pins 38 project beyond the outer sides of the sprocket chains, and the purpose of this construction is to provide means whereby the chains may be steadied in their travel and particularly that stretch of each chain which is traveling downwardly and the lenses supported by the links of which are traveling in consonance with the film 12. With this end in view, guide plates 41 are secured to the edges of the uprights 22 which are presented toward the optical system of the apparatus and project inwardly from the said uprights toward the sprocket chains and constitute a guiding surface along which the reduced ends of the pins may ride as the stretch of the chain, referred to above, travels downwardly. Brackets 42 are fixed upon the uprights 22 and extend toward that side of the compartment 6 at which the optical system is located and these brackets support uprights 43 each of which is formed with upper and lower threaded openings 44 into which are threaded bearing sleeves 45 having heads 46 at their outer ends whereby they may be secured in place within the openings 44, the heads being formed with transverse grooves 47 to accommodate the bit of a screw driver for this purpose. It will be observed that the uprights 43 are located directly opposite the guide plates 41 and that a pair of the sleeves 45 is supported by each of the uprights, the sleeves being located in a vertical plane with the said guide plates 41. Each sleeve 45 has a bore 48 and the bores of the sleeves of each set accommodate stems 49 which are slidable therein and support a presser plate 50 which opposes the respective guide plate 41. A spring 51 is arranged upon each sleeve 45 and bears at one end against the presser plate 50 and at its other end against an adjusting nut, preferably of the knurled type, indicated by the numeral 52, which is threaded upon the respective sleeve. At this point it will be evident that the springs 51 yieldably hold the presser plates 50 in frictional engagement with the reduced projecting ends of the pins 38, so that these projecting ends are steadied in their passage between the guide plates 41 and the respective presser plates 50, thereby eliminating vibration and insuring of smooth and even travel of this stretch of the sprocket chains. It will also be evident that by adjusting the nuts 52, the tension of the springs 51 may be varied so that the plates 50 may be caused to bear more or less firmly against the said reduced extensions 37 of the pins 38.

The projecting lenses embodying the invention are indicated in general by the numeral 53 and it will be observed that the lens is of the double convex type and of oblong rectangular form. In fact, each lens will have the spherical contour of so much of a circular double convex lens as would be defined or bounded by a rectangle symmetrically located with relation to the optical axis of the said lens. The lens 53 is mounted within a thin rectangular metallic frame 54, the sides of which are relatively narrow, and the frame 54 is supported by a plate 55, by having one of its end members welded or otherwise united to the face of the plate. The plate 55 is of a height equal to the height of the end of the frame 54 and the plate extends transversely of the said end of the frame and an equal distance at opposite sides of the plane thereof, the plate being provided at its ends with openings 56 through which screws 57 are fitted and threaded into threaded sockets 58 formed in the body portions 34 of the links of the sprocket chains, each pair of links of the two chains supporting one of the said plates, between them. It will now be observed that the arrangement is such that as the stretches of the sprocket chains which are next adjacent the optical system travel downwardly between the sprockets 25 and 32, the lenses carried by the links of the chains will be caused to assume a position with their longitudinal edges, or, more specifically, the upper and lower members of their frames, contacting one another, and due to the rectangular form of the lenses and their supporting frames, the optical axes of relatively adjacent lenses will be positioned at a minimum distance apart. As previously stated, the lenses are caused to travel in consonance or synchronism with the film, and as each lens 53 passes the axis of the optical system, it will be directly opposite and in focal registration with a respective picture area of the film. The height of the lenses, or their shorter dimensions, is equal substantially to the height of the picture areas of the film and, therefore, inasmuch as several of the lenses, in the present instance three, are at all times traveling downwardly past the axis of the optical system, as one picture area is projected onto the screen and passes therefrom, a succeeding picture area is projected onto the screen and, therefore, the projection is substantially continuous. It will also be evident that inasmuch as each lens 53 has the form of a rectangular section of a circular lens, the boundaries of which section are symmetrically located with relation to the optical axis of the section, the lens will possess a maximum effective area and, inasmuch as the lenses are automatically assembled edge to edge as they travel in succession past the optical axis of the optical system, there will be a maximum illumination of the screen, which would not be the case if the lenses were of circular form. Consequently, the picture areas of the film will be projected with maximum brilliancy and distinctness.

In order that the lenses 53 and the picture areas of the film may be brought into exact optical registration, the worm 31 is splined upon the shaft 18, as indicated by the numeral 59, so that it may have longitudinal movement thereon, and a yoke 60 is likewise slidably adjustably mounted upon the shaft at the ends of its arms and extends below the shaft and engages, at the said ends of its arms, against the opposite ends of the worm 31. The yoke 60 is provided with a boss 62 having a threaded opening 63 therein and an adjusting screw 64 is rotatably mounted in one side wall of the compartment 5 and is threaded in said opening. It will now be evident that by rotating the screw 64, through the medium of a knurled head 65 provided at the outer end thereof and exteriorly of the compartment 5, the yoke 60 may be adjusted along the shaft 18 so as to impart rotary motion to the pinion 30 and effect forward or reverse travel of the sprocket chains which support the lenses a distance sufficient to effect the desired result.

It will be understood, of course, that the lens frames are of thin metal and, inasmuch as in the ordinary motion picture film, there is a thin or narrow line of demarcation between relatively adjacent picture areas, these lines of demarcation will be precisely opposite the meeting sides of the frames of relatively adjacent lenses, when the film is accurately framed, so that the presence of the frames in no way interferes with the projection of the successive picture areas.

Having thus described the invention, what I claim is:

1. In motion picture projection apparatus, an optical system including a fixed objective lens, means for continuously moving a film past the said lens, a series of objective lenses movable across the focal axis of the fixed objective lens in a rectilinear path parallel with the plane of the picture area of the film, the said movable objective lenses having spaced parallel upper and lower margins and being of a height equal to the height of the picture areas of the film, and means for moving said lenses in consonance with the movement of the film and automatically grouping successive lenses in marginal engagement with one another as they successively pass the focal axis of the fixed objective lens and in optical registration with the respective successive picture areas of the film, the marginal engagement of the lenses registering with the lines of demarcation between successive picture areas.

2. In motion picture projection apparatus, an optical system including a fixed objective lens, means for continuously moving a film past said lens, a series of objective lenses movable across the focal axis of the fixed objective lens, the said movable objective lenses being of rectangular marginal contour corresponding to the contour of the picture areas of the film and symmetrical to the focal axes of the lenses, and means for moving the same in consonance with the movement of the film and with successive lenses in marginal engagement with one another as they pass the focal axis of the fixed objective lens, the marginal engagement of the lenses registering with the lines of demarcation between successive picture areas of the film.

3. In motion picture projection apparatus, an optical system including a fixed objective lens, means for continuously moving a film past the lens, a sprocket gear driven by said means, a second sprocket gear, a sprocket chain trained over said gears, a series of objective lenses carried by the links of said chain for movement across the focal axis of the fixed objective lens with successive lenses in marginal engagement, a guide extending vertically beside the stretch of the sprocket chain which is next adjacent the fixed objective lens, and a pressure device yieldably holding the sprocket chain to said guide whereby to prevent vibration of the lenses as they cross the focal axis of the fixed objective lens.

4. In motion picture projection apparatus, an optical system including a fixed objective lens, means for continuously moving a film past the lens, an endless traveling carrier arranged at one side of the axis of the said objective lens, a series of objective lenses projecting from the said carrier for movement across the focal axis of the fixed objective lens, a vertical guide for that stretch of the said endless carrier which is next adjacent the fixed objective lens, and means holding said stretch of the carrier to the guide whereby to prevent vibration of the lenses as they cross the focal axis of the fixed objective lens.

5. In motion picture projection apparatus, an optical system including a fixed objective lens, means for continuously moving a film past the lens, a sprocket gear driven by said means, a second sprocket gear, a sprocket chain trained over said gears, a series of objective lenses carried by said chain for movement across the focal axis of the fixed objective lens, spaced guides arranged beside the stretch of the sprocket chain which is next adjacent the fixed objective lens, pins projecting laterally from the sprocket chain to pass between the said guides, and yieldable means for holding one of the guides in frictional engagement with the pins whereby to steady the movement of said stretch of the chain and prevent vibration of the lenses as they cross the focal axis of the fixed objective lens.

6. In motion picture projection apparatus, an optical system including a fixed objective lens, means for continuously moving a film past the lens, spaced uprights mounted at one side of the optical axis of the lens, upper and lower double sprockets supported by and between the uprights, one of said sprockets being driven from the film moving means, chains trained about the sprockets, pins extending between corresponding links of the chains and having their ends projecting beyond the chains, plates extending between and secured to corresponding links of the chains, objective lenses carried by said plates and extending outwardly therefrom, whereby in the travel of the chains to cross the optical axis of the fixed objective lens, and spaced guides mounted upon each of the uprights and yieldably frictionally engaging the ends of the pins whereby to prevent vibration of the lenses as they cross the focal axis of the fixed objective lens.

7. In motion picture projection apparatus, an optical system including a fixed objective lens, means for continuously moving a film past the lens, parallel chains driven from the film-moving means and mounted at one side of the focal axis of the lens, pins extending between corresponding links of the chains and having their ends projecting beyond the chains, objective lenses supported by and between corresponding links of the chains and extending outwardly therefrom, whereby cross the focal axis of the fixed objective lens, and spaced guides for the projecting ends of the pins whereby to prevent vibration of the lenses as they cross the focal axis of the fixed objective lens, each of said guides comprising a fixed member, a member opposing the fixed member, and means yieldably urging the second mentioned member toward the fixed member to effect frictional engagement with the projecting ends of the pins.

8. In moving picture projection apparatus, an optical system including a fixed objective lens, means for continuously moving a film past the lens, parallel chains mounted at one side of the focal axis of the fixed objective lens and driven from the film-moving means, pins extending between corresponding links of the chains and having their ends projecting beyond the chains, objective lenses supported by and between the chains and extending outwardly therefrom whereby to cross the focal axis of the fixed spaced objective lens, and spaced guides for the projecting ends of the pins whereby to prevent vibration of the lenses as they cross the focal axis of the fixed objective lens, the said guides each comprising a fixed plate, a plurality of tubular bearing members supported opposite said plate, stems slidably mounted in the said bearing members, a plate carried by each set of stems and opposing the fixed plate, the bearing members being threaded, adjusting nuts on the bearing members, and springs bearing between said nuts and the plate carried by the stems.

9. In motion picture projection apparatus, an optical system including a fixed objective lens, means for continuously moving a film past the lens, an endless flexible carrier, means for imparting motion to the carrier in consonance with the movement of the film, rectangular frames upon the carrier arranged in a series throughout the extent thereof and movable thereby across the focal axis of the fixed objective lens, and objective lenses of rectangular marginal contour symmetrical with the focal axes and corresponding to the picture areas of the film.

10. In motion picture projection apparatus, an optical system including a fixed objective lens, means for continuously moving a film past the said lens, an endless flexible carrier, means of imparting travel thereto in consonance with the movement of the film with one stretch of the carrier moving parallel to the line of travel of the film and at one side of the fixed objective lens, and a plurality of objective lenses mounted upon the said flexible carrier and of rectangular marginal contour symmetrical with the focal axes and corresponding to the picture areas of the film and arranged to be grouped by travel of the carrier successively and continuously in position opposite respective picture areas of the film and across the focal axis of the fixed objective lens.

11. In motion picture projection apparatus, a motion head comprising means for continuously feeding a film, an optical system including a fixed objective lens past which the film is fed, a plurality of objective lenses movable across the focal axis of the fixed objective lens in a rectilinear path parallel with the plane of the film, means for continuously moving said movable lenses in consonance with the movement of the film, and means for effecting adjustment of the lens moving means relative to the film feeding means whereby to focally register the said movable lenses with respect to respective picture areas of the film, said adjusting means also operatively connecting the lens moving means with the film feeding means.

12. In motion picture projection apparatus, a motion head comprising means for continuously feeding a film including an operating shaft, an optical system including a fixed objective lens past which the film is fed, and a plurality of objective lenses movable across the focal axis of the fixed objective lens in a rectilinear path parallel with the plane of the film, means for supporting and continuously moving said movable lenses in consonance with the movement of the film comprising spaced shafts, and an endless flexible carrier trained about the shafts and carrying said lenses, a worm upon the operating shaft of the film feeding means and adjustable longitudinally thereof, means for adjusting said worm, and a worm pinion upon one of the lens carrier shafts meshing with the said worm.

In testimony whereof I affix my signature.

McCLELLAN C. FULLENLOVE. [L. S.]